(12) United States Patent
Giri et al.

(10) Patent No.: US 8,714,911 B2
(45) Date of Patent: May 6, 2014

(54) IMPINGEMENT PLATE FOR TURBOMACHINE COMPONENTS AND COMPONENTS EQUIPPED THEREWITH

(75) Inventors: Sheo Narain Giri, Bangalore (IN); Siddaraja Mallikarjuna Devangada, Bangalore (IN); Brad Wilson VanTassel, Easley, SC (US); Debdulal Das, Bangalore (IN)

(73) Assignee: General Electric Company, Schenectady, NY (US)

( * ) Notice: Subject to any disclaimer, the term of this patent is extended or adjusted under 35 U.S.C. 154(b) by 674 days.

(21) Appl. No.: 12/985,498

(22) Filed: Jan. 6, 2011

(65) Prior Publication Data

US 2012/0177478 A1    Jul. 12, 2012

(51) Int. Cl.
*F01D 25/12*   (2006.01)
(52) U.S. Cl.
USPC .......................................................... 415/116
(58) Field of Classification Search
CPC ....................... F05B 2240/80; F05B 2260/201
USPC ........... 415/115, 116, 215.1; 416/93 R, 97 R; 165/908
See application file for complete search history.

(56) References Cited

U.S. PATENT DOCUMENTS

| | | | | |
|---|---|---|---|---|
| 3,628,880 A | * | 12/1971 | Smuland et al. ............... | 415/175 |
| 4,573,866 A | * | 3/1986 | Sandy et al. ................... | 415/116 |
| 4,645,415 A | * | 2/1987 | Hovan et al. ................... | 415/115 |
| 4,693,667 A | | 9/1987 | Lenz et al. | |
| 5,116,199 A | * | 5/1992 | Ciokajlo ..................... | 415/173.2 |
| 5,152,666 A | * | 10/1992 | Stripinis et al. ................ | 415/178 |
| 5,363,654 A | * | 11/1994 | Lee ................................... | 60/752 |
| 5,480,281 A | | 1/1996 | Correia | |
| 6,341,485 B1 | * | 1/2002 | Liebe ............................... | 60/772 |
| 6,659,714 B1 | * | 12/2003 | Tiemann ....................... | 415/115 |
| 7,270,175 B2 | * | 9/2007 | Mayer et al. ..................... | 165/47 |
| 2008/0101923 A1 | * | 5/2008 | Botrel et al. ................ | 415/173.1 |
| 2010/0316492 A1 | * | 12/2010 | Charron et al. ............ | 415/182.1 |

FOREIGN PATENT DOCUMENTS

GB      2221291 A   *   1/1990

* cited by examiner

*Primary Examiner* — Ned Landrum
*Assistant Examiner* — Liam McDowell
(74) *Attorney, Agent, or Firm* — Ernest G. Cusick; Gary M. Hartman; Domenica N. S. Hartman

(57) ABSTRACT

An impingement plate adapted to reduce thermally-induced strains and stresses that may damage the plate or its attachment to a second component. The plate includes an interior region having cooling holes, a peripheral wall surrounding the interior region and projecting out of the plane of the interior region, a peripheral flange surrounding the peripheral wall and lying in a plane spaced apart from the plane of the interior region, and one or more through-thickness rib. One such rib may be disposed in the interior region, project away from and out of the plane of the interior region, and linearly extend across the interior region. Alternatively or in addition, one such rib may be disposed between the peripheral wall and flange and project out of the plane of the flange.

20 Claims, 4 Drawing Sheets

Axial   Hoop

IMPINGEMENT PLATE FOR TURBOMACHINE COMPONENTS AND COMPONENTS EQUIPPED THEREWITH

BACKGROUND OF THE INVENTION

The present invention generally relates to turbomachinery, and more particularly to methods and hardware capable of cooling turbomachinery components while reducing thermally-induced strains and stresses that result from components of an assembly exhibiting different amounts of thermally expansion.

Higher operating temperatures for gas turbines, including aircraft gas turbine engines and land-based gas turbine engines used in the power-generating industry, are continuously sought in order to increase their efficiency. However, as operating temperatures increase, the high temperature durability of the engine components must correspondingly increase. Significant advances in high temperature capabilities have been achieved through the formulation of iron-, nickel- and cobalt-based superalloys. Nonetheless, superalloy components must often be air-cooled and/or protected by some form of thermal and/or environmental coating system in order to exhibit suitable service lives in certain sections of a gas turbine engine, such as the turbine, combustor and augmentor.

As an example, FIG. 1 represents an axial cross-section of a nozzle segment 10 of a land-based gas turbine engine. The nozzle segment 10 is one of a number of nozzle segments that are assembled together to form an annular-shaped high pressure turbine (HPT) nozzle assembly of the turbine engine. The segment 10 is made up of at least one vane 12, which defines an airfoil and extends between inner and outer sidewalls 14 and 16 (also referred to as platforms or bands). The vane 12 and sidewalls 14 and 16 can be formed separately and then assembled, such as by brazing the ends of the vane 12 within openings defined in the sidewalls 14 and 16. Alternatively, the entire segment 10 can be formed as an integral casting. The vane 12 and sidewalls 14 and 16 can be formed of such conventional materials as nickel-, cobalt-, or iron-based superalloys of types suitable for use in gas turbine engines.

As a result of being located in the high pressure turbine section of the engine, the vane 12 and the surfaces of the sidewalls 14 and 16 facing the vane 12 are subjected to the hot combustion gases from the engine's combustor. A thermal barrier coating (TBC) system may be applied to the surfaces of the vane 12 and sidewalls 14 and 16 exposed to the hot combustion gases to provide environmental protection and reduce heat transfer to the segment 10. Alternatively or in addition, compressor bleed air may be supplied to the vane 12 and sidewalls 14 and 16 to provide forced air cooling, such as by an impingement or film cooling technique. As an example, FIG. 1 represents the use of an impingement cooling technique on both the inner and outer sidewalls 14 and 16 of the nozzle segment 10, and FIG. 2 provides a more detailed view illustrating impingement cooling of the sidewall 16. In FIG. 1, impingement plates 18 and 20 are shown as coupled to the sidewalls 14 and 16 to create a cavity or chamber 22 therebetween. Bleed air is drawn from the engine's compressor (not shown) and supplied to the sides of the impingement plates 18 and 20 facing away from their respective sidewalls 14 and 16. Numerous small apertures, sometimes referred to as impingement cooling holes 24 (FIG. 2), are present in the plates 18 and 20 that direct the bleed air in a normal direction toward the surfaces of the sidewalls 14 and 16 opposite the vane 12, achieving what is referred to as backside cooling of the sidewalls 14 and 16. FIG. 2 further shows the outer sidewall 16 as having film cooling holes 26 through which the cooling air within the chamber 22 is discharged at an acute angle to the surface of the sidewall 16 facing the hot gas path of the engine to achieve a film cooling effect at that surface. Impingement and film cooling techniques are well known in the art, and therefore do not require further explanation.

As one would expect, the nozzle segment 10 expands and contracts when heated and cooled, respectively, during transient engine operating conditions. Because they are in direct contact with the hot combustion gases, the vane 12 and sidewalls 14 and 16 sustain temperatures that are significantly higher than the mounting hardware to which the sidewalls 14 and 16 are attached. Because both surfaces of the impingement plates 18 and 20 are directly contacted by the cooling air, the plates 18 and 20 also tend to be at lower temperatures than the sidewalls 14 and 16. As a result, the sidewalls 14 and 16 typically expand and contract more than the impingement plates 18 and 20.

The impingement plates 18 and 20 are often fabricated from thin sheet metal to minimize their weight and simplify the creation of their cooling holes 24. The plates 18 and 20 are typically attached to their respective sidewalls 14 and 16, often with welds or some combination of welds and clamps. As a nonlimiting example, FIG. 3 schematically represents a plan view of the impingement plate 20 nested within a recess 28 defined in the outer sidewall 16 and surrounding the chamber 22 (not seen), and represents the periphery 30 of the plate 20 being attached with spot welds 32 to the sidewall 16. The inner sidewall 14 and its impingement plate 18 can be similarly configured to that shown in FIG. 3 for the outer sidewall 16 and plate 20. FIG. 4 is a partial cross-section of FIG. 3 representing one of the welds 32. The periphery 30 of the plate 20 is represented as lying in a separate plane from the bulk of the plate 20, with roughly an S-shaped wall 34 therebetween.

As the sidewall 16 thermally expands, the sidewall 16 will move leftward in FIG. 4 a greater distance than the periphery 30 of the plate 20 due to differences in the temperatures of the sidewall 16 and plate 20, as explained above. Because the weld 32 rigidly attaches the plate 20 to the sidewall 16, strains and stresses are induced in the weld 32 as well as the plate 20. Consequently, the plate 20 and weld 32 are both prone to damage from thermally-induced strains and stresses that occur as the sidewall 16 thermally expands during high temperature excursions. As reported in U.S. Pat. No. 4,693,667, which discloses an impingement plate having a similar S-shaped portion along its perimeter, the S-shaped wall 34 of the plate 20 is capable of accommodating differences in thermal expansion between the plate 20 and sidewall 16 to some degree. However, experience has shown that relatively thin impingement plates 18 and 20 and welds 32 of the types represented in FIGS. 3 and 4 are nonetheless susceptible to cracking and fragmenting.

Because cracks and voids in the plate 20 provide additional passages through which bleed air can flow through the plate 20, damage to the plate 20, though not likely to be pose a direct structural concern, can lead to oxidation and cracking of the sidewall 16 due to a lack of efficient cooling air flow toward the sidewall 16. In addition, cracks and voids in the plate 20 can result in excessive loss of bleed air and reduce the overall efficiency of the engine. Therefore, there is a need for more robust designs for impingement plates to reduce their likelihood of cracking during engine operation.

BRIEF DESCRIPTION OF THE INVENTION

The present invention provides an impingement plate suitable for cooling turbomachinery components, for example, one or both sidewalls of a nozzle segment, while reducing thermally-induced strains and stresses that may damage the plate.

According to a first aspect of the invention, the impingement plate includes an interior region substantially lying in a plane and having through-holes configured as impingement cooling holes, a peripheral wall surrounding the interior region and projecting out of the plane of the interior region, a peripheral flange surrounding the peripheral wall and lying in a plane spaced apart from the plane of the interior region, and one or more through-thickness ribs that are disposed in the interior region and/or disposed between the peripheral wall and the peripheral flange. If the rib is disposed in the interior region, the rib is continuous, projects away from and out of the plane of the interior region, and linearly extends across a width of the interior region from a first portion of the peripheral flange and through an adjacent first portion of the peripheral wall and through a second portion of the peripheral wall to an adjacent second portion of the peripheral flange. If the rib is disposed between the peripheral wall and the peripheral flange, the rib is continuous and projects out of the plane of the peripheral flange.

Another aspect of the invention is a component of a turbomachine in which the impingement plate is installed, a non-limiting example of which is a sidewall of a nozzle segment of a gas turbine engine.

A technical effect of this invention is the ability of the impingement plate to compensate for differential thermal growth in the plate and a component to which the plate is attached, and thereby reduce shear stresses the plate and the means (for example, welds) by which the plate is attached to the component. In this manner, the plate is capable of exhibiting increased weld life and reduced cracking during high temperature excursions that result in differential thermal growth in the plate and the component to which the plate is attached.

Other aspects and advantages of this invention will be better appreciated from the following detailed description.

DETAILED DESCRIPTION OF THE INVENTION

FIGS. 5 through 15 schematically represent embodiments for an impingement plate 50 encompassed by the present invention. Though multiple embodiments are represented, for convenience consistent reference numbers are used throughout FIGS. 5 through 15 to identify the same or functionally equivalent elements. As will become apparent from the following discussion, the impingement plate 50 is capable of being used in a nozzle segment similar to that represented in FIG. 1, though nozzle segments having different configurations are also within the scope of the invention. In any event, the impingement plate 50 will be described in reference to its use in a nozzle assembly of a gas turbine engine, for example, a land-based or aircraft gas turbine engine. However, it should also be appreciated that the benefits of the invention can be applied to a variety of other components that benefit from impingement cooling, including but not limited to other hot section components of gas turbine engines. Finally, to facilitate the description provided below, terms such as "vertical," "horizontal," "lateral," "front," "rear," "side," "forward," "rearward," "upper," "lower," "above," "below," "right," "left," etc., will be used in reference to the perspective of the orientation of the plate 50 in FIG. 5, and therefore are relative terms and should not be otherwise interpreted as limitations to the construction, installation and use of the plate 50 or as limiting the scope of the invention.

Figure 5:
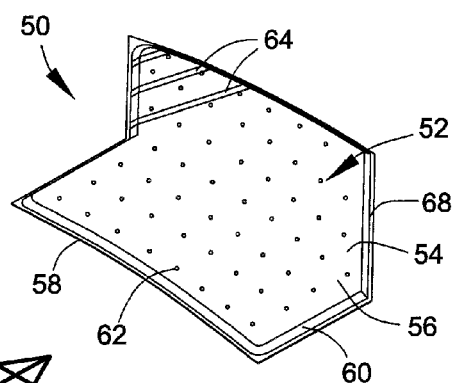
FIG. 5 is a perspective view showing an impingement plate suitable for attachment to one of the sidewalls of FIG. 1, wherein a region of the plate is formed to have through-thickness ribs in accordance with an embodiment of the present invention.

The plate 50 can be formed from a variety of materials suitable for use in gas turbine engines, including such conventional materials as a nickel-, cobalt-, and iron-based alloys. The plate 50 has an interior region 52 that defines opposing surfaces 54 and 56, one of which is adapted to face a sidewall of a nozzle segment, as was described for the impingement plate 10 shown in FIGS. 1 through 4. Furthermore, the plate 50 is represented as having a peripheral edge 58 whose outline is intended to enable the plate 50 to be attached to a sidewall of a nozzle segment and define a cavity or chamber (not shown) therebetween, again similar to what was described for the impingement plate 10 of FIGS. 1 through 4. The impingement plate 50 is represented in FIG. 5 as having a generally planar shape, though with some curvature corresponding to the curvature of the sidewall and the overall curvature of the nozzle assembly in which the nozzle segment is assembled. Nonetheless, for the convenience of describing various aspects of the plate 50, the plate 50 will be described in reference to planes, for example, in which the interior region 52 and peripheral edge 58 lie. The plate 50 is also depicted as having a peripheral wall 60 that completely surrounds the interior region 52 and is adjacent to but spaced inwardly from a peripheral flange 68 that defines the edge 58. As a result of the wall 60, the interior region 52 of the plate 50 lies in a plane that is spaced apart in a radial direction of the engine from the plane containing the peripheral flange 68. The wall 60 is represented as inclining inwardly toward the interior region 52 and away from the flange 68, though it should be understood that the wall 60 could be normal or at some other angle to the plane defined by the flange 68.

Figure 1:
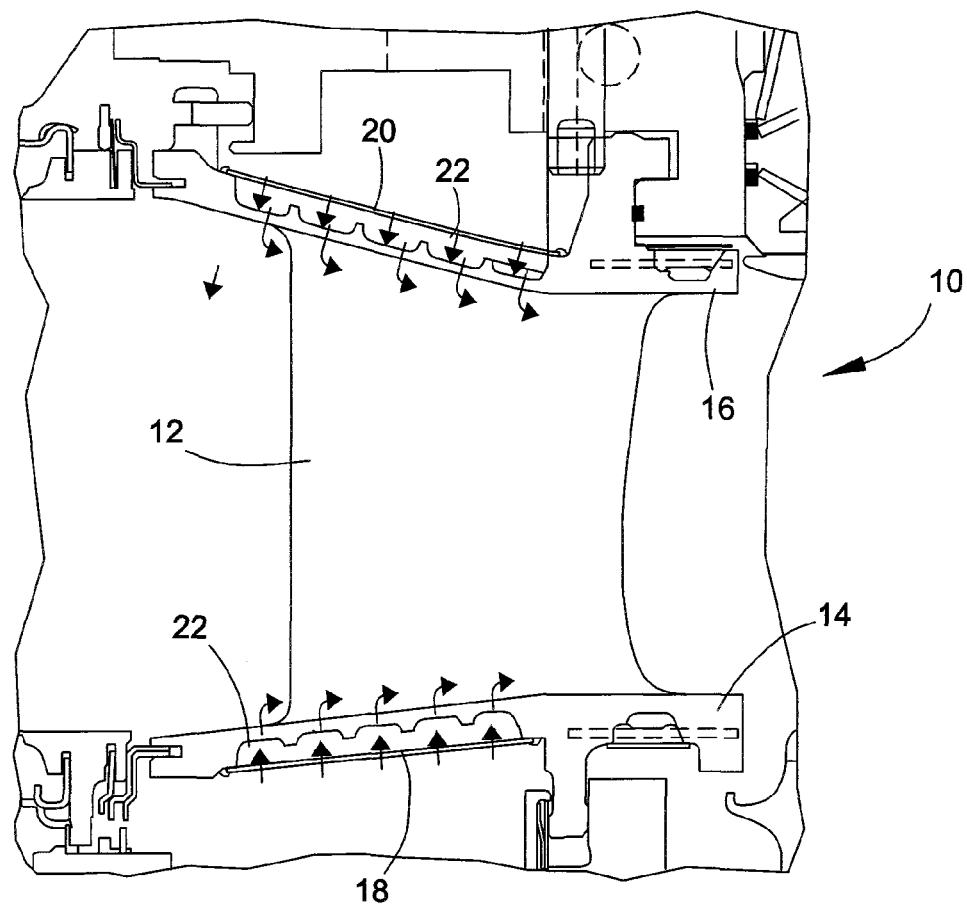
FIG. 1 is a cross-sectional view of a nozzle segment for a gas turbine engine according to the prior art.
Figure 2:
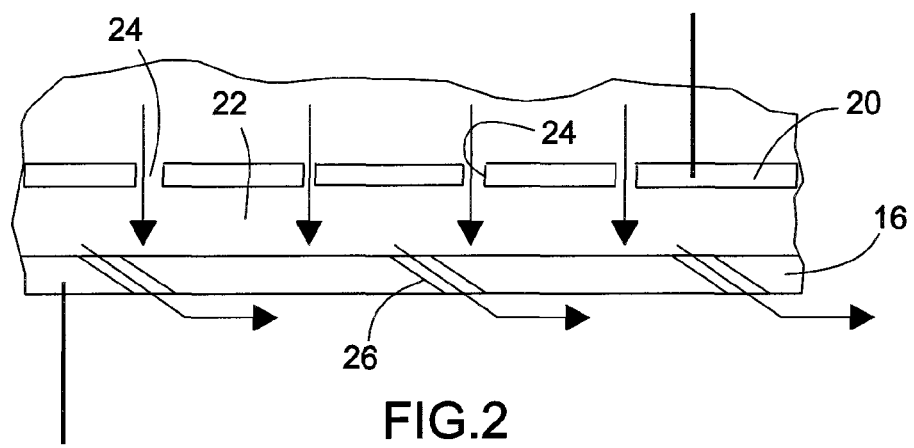
FIG. 2 is a detailed cross-sectional view showing a sidewall of the nozzle segment of FIG. 1 and an impingement plate attached to the sidewall.
Figure 3:
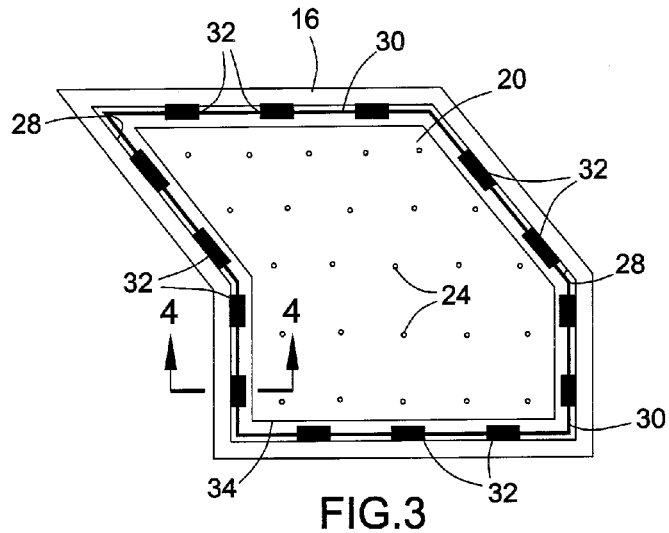
FIG. 3 is a plan view showing the attachment of the impingement plate to the sidewall of the nozzle segment of FIG. 2.
Figure 4:
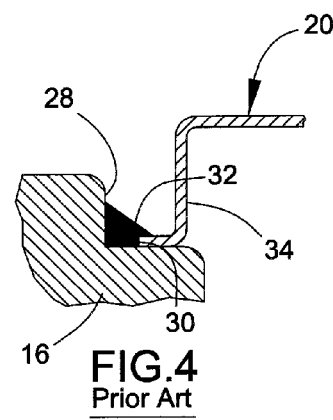
FIG. 4 is a detailed cross-sectional view taken along section 4-4 of FIG. 3.

For purposes of discussing strains and stresses within the plate 50, FIG. 5 includes labels indicating the axial and hoop directions corresponding to the axial and circumferential directions, respectively, of a nozzle assembly in which the plate 50 may be installed. Cooling air, such as bleed air drawn from the engine's compressor (not shown), can be supplied to the surface 52 of the impingement plate 50 facing away from the sidewall. For convenience, FIG. 5 shows only one of potentially numerous small apertures (impingement cooling holes) 62 that, as described in reference to FIGS. 1 and 2, are present in the plate 50 to direct the cooling air in a normal direction toward the surface of the sidewall facing the plate 50 to achieve backside cooling of the sidewall. Thereafter, the cooling air can exit the chamber through cooling holes, such as film cooling holes formed in the sidewall, essentially as depicted in FIG. 2. The invention can make use of impingement and film cooling techniques well known in the art, and therefore this aspect of the invention will not be described in any further detail. Other features that might be defined or present on or through the plate 50 are not represented in FIG. 5, though it should be understood that the presence of such features is within the scope of the present invention.

Figure 6:
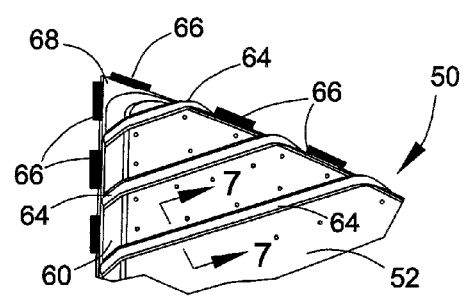
FIG. 6 is a detailed view of the region of the impingement plate of FIG. 5.

The embodiment of the impingement plate 50 depicted in FIG. 5 and its associated detailed view in FIG. 6 is represented as having through-thickness ribs 64. According to a preferred aspect of the invention, the ribs 64 serve to reduce shear stresses in the plate 50 that can occur as a result of the sidewall (to which the plate 50 is attached) exhibiting greater thermal expansion than the plate 50, for example, as a result of the sidewall being at a higher temperature than the plate 50. The term "through-thickness" is used herein in the sense that the ribs 64 extend completely through the thickness of the interior region 52, resulting in a raised surface contiguous with the surface 54 of the interior region 52 and a recessed surface contiguous with the opposite surface 56 of the interior region 52. As represented in FIGS. 5 and 6, the ribs 64 are represented as being located within a limited portion of the interior region 52 of the plate 50, though it should be appreciated that the ribs 64 could be present throughout the interior region 52 or in additional or other portions of the interior region 52.

Figure 7:
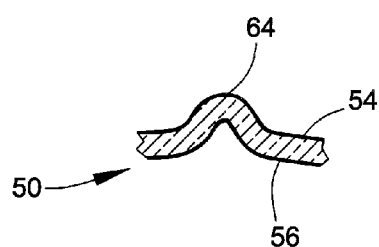
FIG. 7 is a cross-sectional view taken along section 7-7 of FIG. 6.

FIG. 6 schematically represents various locations for spot welds 66 located along the peripheral edge 58 and with which the plate 50 can be attached to its sidewall. The welds 66 define separate rigid attachment points between the plate 50 and its sidewall, with the result that strains and stresses will be induced in the plate 50 if the sidewall thermally expands to a greater extent than the plate 50 during a high temperature excursion. Each rib 64 is represented as being linear, projecting away from and out of the plane of the interior region 52, and extending entirely across a width of the interior region 52 between two portions of the peripheral wall 60 that are separated by the width of the interior region 52 traversed by the rib 4. The rib 64 is also represented as extending through the two portions of the wall 60, and terminating at each of the intersections that the portions of the wall 60 define with the peripheral flange 68. In preferred embodiments, the ribs 64 do not continue through the flange 68 to the edge 58, and therefore do not interfere with the ability of the flange 68 to inhibit cooling air leakage between the plate 50 and its sidewall. According to a preferred aspect of the invention, each rib 64 is represented as terminating at two locations adjacent two portions of the peripheral flange 58, which in turn are each between a pair of adjacent welds 66 on the peripheral edge 58 of the plate 50. As such, a plane passing through a rib 64 in a direction normal to the plane of the plate interior region 52 does not pass through a weld 66. In this manner, the wall sections of the plate 50 to either side of a rib 64 are able to move apart in directions transverse to the rib 64 as represented in FIG. 7, and such movement can be accommodated by the rib 64 as a result of the rib 64 being deformed, what can generally be described as becoming straightened or flattened relative to the curvature of the rib 64 seen in FIG. 7.

In addition to being linear, the ribs 64 are represented in FIGS. 5 and 6 as oriented substantially parallel to the axial direction of the plate 50, promoting the ability of the ribs 64 to compensate for thermal expansion in the hoop direction of the plate 50. This orientation is intended to accommodate the greater degree of thermal expansion that may occur in the hoop direction resulting from the annular construction of a nozzle assembly, though it is foreseeable that the ribs 64 could be oriented parallel to the hoop direction to better compensate for thermal expansion in the axial direction of the plate 50, or oriented at some other angle to the axial or hoop direction. A suitable number of ribs 64 and a suitable spacing between adjacent ribs 64 can be determined through analysis and/or experimental testing. It should be appreciated that the number and spacing of the ribs 64 will also depend in part on the number and spacing of the welds 66 that attach the plate 50 to its sidewall.

Figure 8:
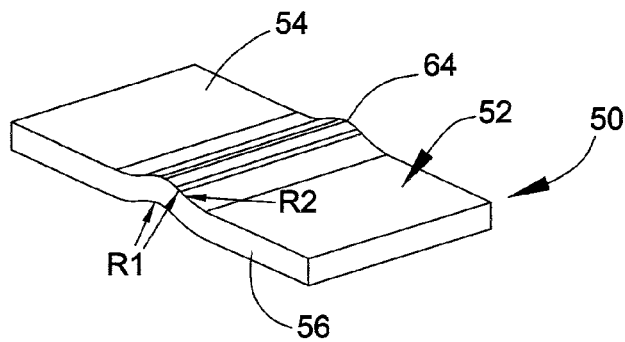
FIGS. 8 through 11 are cross-sectional views of through-thickness ribs that are alternatives to the through-thickness ribs of FIGS. 5 through 7.
Figure 9:
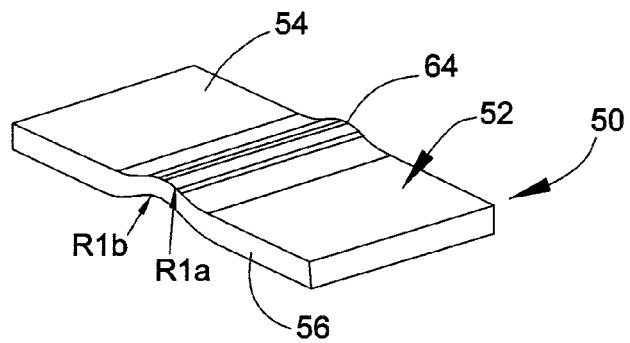
Figure 10:
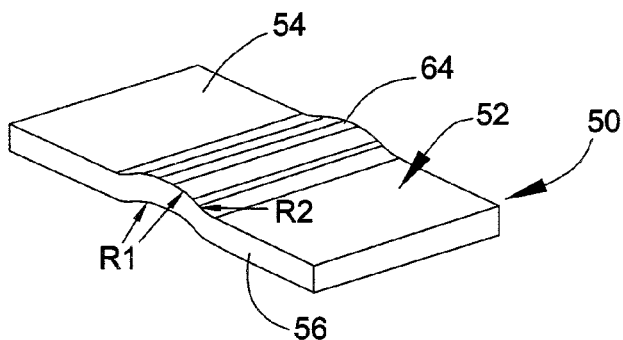
Figure 11:
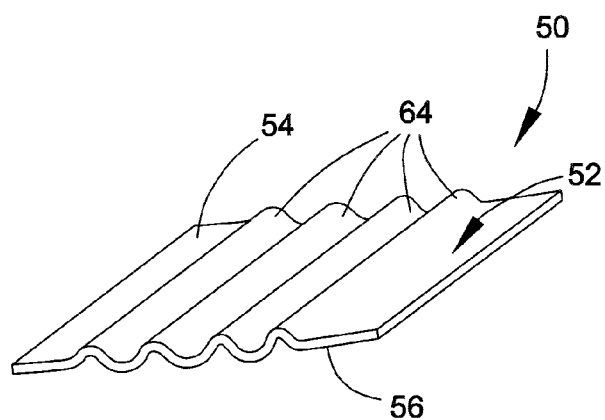

The cross-sectional contours or shapes of the ribs 64 can be identical or vary within the plate 50. In FIG. 8, a rib 64 is represented as having roughly equal radii of curvature (R1) at its opposing surfaces (corresponding to the surfaces 54 and 56 of the plate 50), and fillet radii (R2) that are each roughly twice as large as R1. Alternatively, FIG. 9 represents a rib 64 having a radius of curvature (R1a) at its outer surface (corresponding to the surface 54 of the plate 50) that is greater than the radius of curvature (R1b) at its inner surface (corresponding to the surface 56 of the plate 50), resulting in the rib 64 being thinner than the remainder of the plate 50 between ribs 64. Another embodiment of a rib 64 is represented in FIG. 10 as having roughly equal radii of curvature (R1) at its opposing surfaces (corresponding to the surfaces 54 and 56 of the plate 50), and fillet radii (R2) that are less than R1. Analysis of the configurations of FIGS. 8 through 10 indicated that they are capable of reducing shear stresses in their adjacent welds 66 by about 50% or more, compared to an impingement plate that differs only by the omission of the ribs 64. Other combinations of ribs 64 and radii R1 and R2 are also within the scope of the invention. For example, FIG. 11 depicts an embodiment in which multiple ribs 64 are defined side-by-side in the interior region 52 of the plate 50. The ribs 64 depicted in FIG. 11 can be spaced sufficiently close so that they are all accommodated between pairs of adjacent welds 66 along opposite portions of the peripheral edge 58 of the plate 50. The ribs 64 are essentially parallel to each other and define a sinusoidal cross-section. While ribs 64 with continuous cross-sectional curvatures are represented in FIGS. 7 through 11, rectilinear cross-sectional shapes and combinations of both curvilinear and rectilinear cross-sectional shapes are also foreseeable for the ribs 64.

In view of the above, the ribs 64 are intended to compensate for differential thermal growth in the plate 50 and its sidewall, and thereby reduce shear stresses in the welds 66 between adjacent pairs of ribs 64. As a result, the plate 50 is capable of exhibiting increased weld life and reduced cracking during the operation of a gas turbine engine in which the plate 50 and its nozzle segment are installed. Another aspect of the ribs 64 arises from their ability to increase the stiffness of the plate 50.

Figure 12:
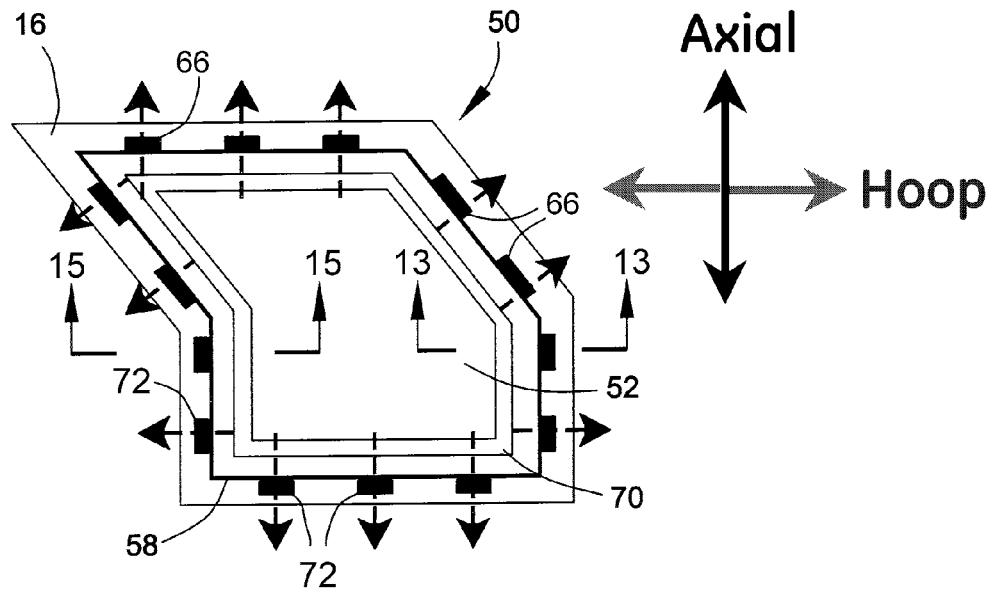
FIG. 12 is a plan view showing an impingement plate attached to one of the sidewalls of FIG. 1, wherein a peripheral region of the plate is formed to have a through-thickness rib in accordance with another embodiment of the present invention.
Figure 15:
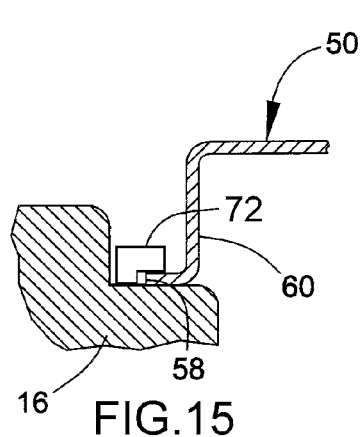
FIG. 15 is a detailed cross-sectional views taken along section 15-15 of FIG. 12 and showing a clamp for securing the plate.
Figure 13:
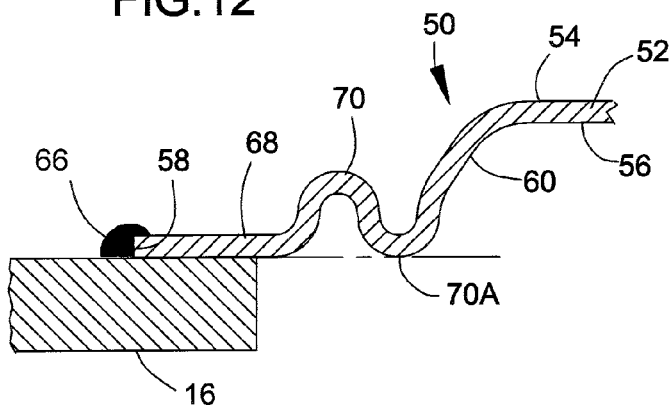
FIGS. 13 and 14 are alternative detailed cross-sectional views taken along section 13-13 of FIG. 12 and showing two alternative through-thickness ribs for the peripheral region of the plate.
Figure 14:
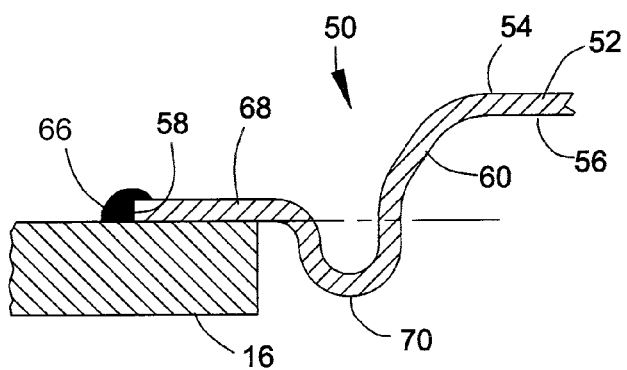

FIGS. 12 through 15 represent another approach intended to increase the lives of the welds 66 and reduce the incidence of cracks developing in the plate 50. In particular, FIGS. 12 through 14 represent the impingement plate 50 as having at least one rib 70 defined between the peripheral wall 60 and the peripheral flange 68. The rib 70 is preferably continuous along the entire perimeter of the plate 50, though it is foreseeable that a discontinuous or intermittent rib 70 might be acceptable under some circumstances. The rib 70 may be an alternative to or in addition to the ribs 64 described in reference to FIGS. 5 through 11. FIG. 12 and in particular FIG. 15 further represent the plate 50 as being secured along two of its adjacent edges 58 with clamps 72. Each clamp 72 defines a gap with the adjacent edge 58 of the plate 50, and as such permits movement of the edge 58 in a direction away from the interior region 52 of the plate 50. The inclusion of the clamps 72 is an optional feature that is equally applicable to the embodiment of the invention shown in FIGS. 5 through 11.

With reference to FIG. 13, the wall 60 of the plate 50 extends toward and preferably to the plane of the peripheral flange 68, and the rib 70 projects away from and out of the plane of the flange 68, as well as away from the plane of the surface of the sidewall 16 to which the plate 50 is attached with the welds 66. The cross-sectional shape depicted in FIG. 13 effectively defines a pair of side-by-side ribs, namely, the rib 70 projecting out of the plane of the flange 68 in the same direction as the wall 60, and an oppositely-projecting second rib 70A that is defined by a portion of the wall 60 and a portion of the rib 70, and therefore projects toward the plane of the flange 68. Both ribs 70 and 70A are represented as being disposed on the same side of the plane of the surface of the sidewall 16. The embodiment of FIG. 14 differs as a result of the rib 70 projecting downward from the wall 60, so as to project through and out of the plane of the flange 68, as well as through and out of the plane containing the surface of the sidewall 16.

The effect of the peripherally continuous ribs 70 and 70A (FIG. 13) or rib 70 (FIG. 14) is to allow the sidewall 16 to expand in essentially any direction (including the axial and hoop directions) to an extent greater than the plate 50, as indicated by the arrows in FIG. 12. More particularly, the flange 68 of the plate 50 surrounding the rib(s) 70/70A is able to move with the sidewall 16 in a direction away from the interior region 52 of the plate 50 and transverse to the rib(s) 70/70A as represented by the arrows in FIGS. 12, 13 and 14, and such movement can be accommodated by the rib(s) 70/70A as a result of the rib(s) 70/70A being deformed in a manner that can generally be described as becoming straightened or flattened relative to the curvature of the rib(s) 70/70A seen in FIGS. 13 and 14. In doing so, the rib(s) 70/70A are able to compensate for differential thermal growth and reduce shear stresses in the welds 66 that attach the plate 50 to the sidewall 16. The rib(s) 70/70A can provide the additional benefit of increasing the out-of-plane stiffness of the plate 50.

While the invention has been described in terms of particular embodiments, it is apparent that other forms could be adopted by one skilled in the art. For example, a nozzle segment on which the impingement plate 50 is installed could be configured differently from that shown in the Figures while still achieving one or more of the intended objects of the invention. Furthermore, the geometric outline or shape of the periphery of the plate 50 will depend on the geometry of the sidewall to which the plate 50 is attached. Accordingly, the scope of the invention is to be limited only by the following claims.

The invention claimed is:

1. An impingement plate adapted for impingement cooling a component, the impingement plate comprising:
    an interior region substantially lying in a plane and having through-holes configured as impingement cooling holes;
    a peripheral wall surrounding the interior region and projecting out of the plane of the interior region;
    a peripheral flange surrounding the peripheral wall and lying in a plane spaced apart from the plane of the interior region; and
    at least a first through-thickness rib disposed in the interior region,
    wherein the first rib is continuous, projects away from and out of the plane of the interior region, and linearly extends across a width of the interior region from a first portion of the peripheral flange and through an adjacent first portion of the peripheral wall and through a second portion of the peripheral wall to an adjacent second portion of the peripheral flange.

2. The impingement plate according to claim 1, wherein the first rib is one of a plurality of parallel ribs in the interior region.

3. The impingement plate according to claim 1, wherein the component is a component of a turbomachine and the plate is attached to the component with a plurality of clamps located at a peripheral edge defined by the peripheral flange of the impingement plate, the clamps being adapted to permit movement of the peripheral edge in a direction away from the interior region of the impingement plate.

4. The impingement plate according to claim 1, wherein the component is a component of a turbomachine and the plate is attached to the component with a plurality of spot welds located at a peripheral edge defined by the peripheral flange of the impingement plate.

5. The impingement plate according to claim 4, wherein each of the first and second portions of the peripheral flange is disposed between, respectively, first and second adjacent pairs of the spot welds.

6. The impingement plate according to claim 4, wherein the first rib is one of at least a pair of spaced-apart ribs that are disposed in the interior region, continuous, project away from and out of the plane of the interior region, and linearly extend across the width of the interior region from the first portion of the peripheral flange and through the adjacent first portion of the peripheral wall and through the second portion of the peripheral wall to the adjacent second portion of the peripheral flange, and each of the first and second portions of the peripheral flange is disposed between, respectively, first and second adjacent pairs of the spot welds.

7. The impingement plate according to claim 4, wherein the component is a sidewall of a nozzle segment.

8. An impingement plate adapted for impingement cooling a component, the impingement plate comprising:
    an interior region substantially lying in a plane and having through-holes configured as impingement cooling holes;
    a peripheral wall surrounding the interior region and projecting out of the plane of the interior region;
    a peripheral flange surrounding the peripheral wall and lying in a plane spaced apart from the plane of the interior region; and
    at least a first through-thickness rib disposed between the peripheral wall and the peripheral flange, wherein the first rib projects out of the plane of the peripheral flange, and has first and second side portions that lie in the plane of the peripheral flange.

9. The impingement plate according to claim 8, wherein the first rib is continuous along an entire perimeter of the interior region.

10. The impingement plate according to claim 8, wherein the first rib projects away from the plane of the peripheral flange.

11. The impingement plate according to claim 8, further comprising a second rib disposed between the peripheral wall and the peripheral flange.

12. The impingement plate according to claim 11, wherein the second rib is continuous and projects toward the plane of the peripheral flange.

13. The impingement plate according to claim 8, wherein the first rib projects through the plane of the peripheral flange.

14. The impingement plate according to claim 8, further comprising at least a second through-thickness rib disposed in the interior region, wherein the second rib is continuous, projects away from and out of the plane of the interior region, and linearly extends across a width of the interior region from a first portion of the peripheral flange and through an adjacent first portion of the peripheral wall and through a second portion of the peripheral wall to an adjacent second portion of the peripheral flange.

15. The impingement plate according to claim 8, wherein the component is a component of a turbomachine and the plate is attached to the component with a plurality of spot welds located at a peripheral edge defined by the peripheral flange of the impingement plate.

16. The impingement plate according to claim 15, wherein the component is a sidewall of a nozzle segment.

17. A nozzle segment of a gas turbine engine, the nozzle segment comprising first and second sidewalls, a vane supported by and between the first and second sidewalls, and at least one impingement plate defining a chamber with the first sidewall, each of the first and second sidewalls having first surfaces facing a hot gas path of the gas turbine engine and second surfaces facing away from the hot gas path, the impingement plate being attached to the second surface of the first sidewall and adapted to direct cooling air into the chamber to impinge the second surface with the cooling air, the impingement plate comprising:

an interior region substantially lying in a plane and having impingement cooling holes;

a peripheral wall completely surrounding the interior region and projecting out of the plane of the interior region;

a peripheral flange surrounding the peripheral wall and attached to the second surface of the first sidewall, the peripheral flange lying in a plane spaced apart from the plane of the interior region; and at least a first through-thickness rib disposed in the interior region or disposed between the peripheral wall and the peripheral flange, wherein:

if the first rib is disposed in the interior region, the first rib is continuous, projects away from and out of the plane of the interior region, and linearly extends across a width of the interior region from a first portion of the peripheral flange and through an adjacent first portion of the peripheral wall and through a second portion of the peripheral wall to an adjacent second portion of the peripheral flange; and if the first rib is disposed between the peripheral wall and the peripheral flange, the first rib is continuous and projects out of the plane of the peripheral flange, the first rib having first and second side portions that lie in the plane of the peripheral flange.

18. The nozzle segment according to claim 17, wherein the first rib is one of a plurality of parallel ribs in the interior region, the plate is attached to the second surface of the first sidewall with a plurality of spot welds located at a peripheral edge defined by the peripheral flange of the impingement plate, and each of the first and second portions of the peripheral flange is disposed between, respectively, first and second adjacent pairs of the spot welds.

19. The nozzle segment according to claim 17, wherein the first rib is disposed between the peripheral wall and the peripheral flange and projects away from the plane of the peripheral flange.

20. The nozzle segment according to claim 17, wherein the first rib is disposed between the peripheral wall and the peripheral flange and projects through the plane of the peripheral flange.

* * * * *